Aug. 5, 1952      C. E. SWENSON      2,605,853
POWER TAKE-OFF JOINT ASSEMBLY
Filed Oct. 23, 1947
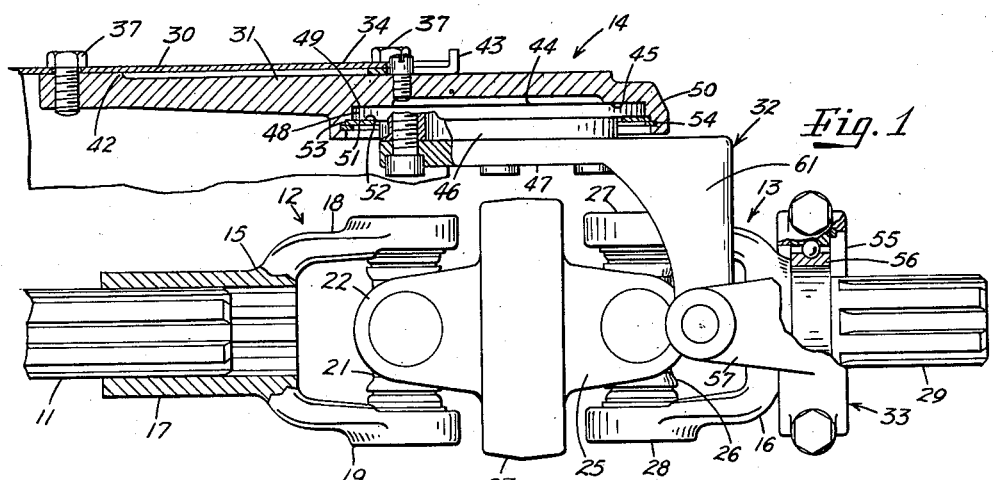
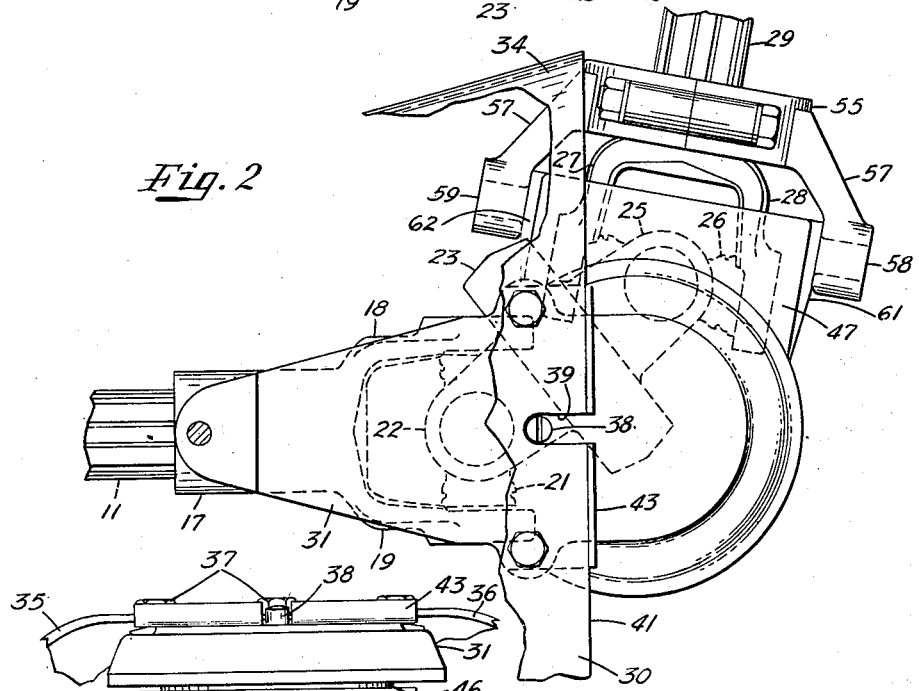
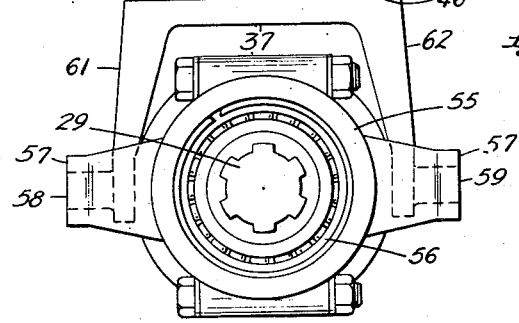
INVENTOR.
Carl E. Swenson
BY McCanna and Morsbach
ATTYS.

Patented Aug. 5, 1952

2,605,853

UNITED STATES PATENT OFFICE 2,605,853

POWER TAKE-OFF JOINT ASSEMBLY

Carl E. Swenson, Rockford, Ill.

Application October 23, 1947, Serial No. 781,618

6 Claims. (Cl. 180—14)

This invention relates to power take-off assemblies for vehicles and the like for use in driving trailing vehicles or machines and has special reference to a universal joint mechanism for driving a driven shaft connected to said vehicle, together with means for supporting the same and controlling the operation thereof.

A primary object of the invention is to provide an assembly of the above character with an improved bearing structure that provides for the assembly, a one-point support on the tractor to provide optimum constant velocity of the driven shaft.

A further and important object of the invention is the provision in a power take-off joint assembly for tractors of novel means for supporting and locating the same on the tractor.

Another object of the invention is to provide an assembly of the above character with improved safety characteristics wherein novel means is provided for supporting and locating a power take-off joint construction which also serves to prevent accidental contact of an operator or falling objects with the rotating parts of the power take-off assembly.

Another object is the provision in a mechanism of the above character with means which minimizes chattering of parts, which assures trouble-free service and which is relatively inexpensive to manufacture.

Other objects and advantages of the invention will become apparent from the following detailed description taken in connection with the accompanying drawings, in which—

Figure 1 is a side view with cutaway portions showing a power take-off assembly embodying my invention;

Fig. 2 is a top view of the assembly with the parts in a different position, and Fig. 3 is an end view of Figure 1.

Referring now to the drawings, the invention is shown embodied in a power take-off assembly of the type arranged to be disposed between a vehicle such as a tractor having a drive shaft 11 and a driven auxiliary or trailing vehicle having a driven shaft (not shown) attached to the tractor by conventional hitching means (not shown). In general, the mechanism comprises two close coupled universal joints 12 and 13 arranged to effect a connection between the drive shaft 11, herein in the form of a splined shaft on the tractor and a driven shaft on an auxiliary machine (not shown), and a mechanism 14 for supporting the joints in a manner to allow for angular displacement between the driving shaft 11 and the driven shaft.

The close coupled universal joints 12 and 13 are arranged to be driven from the driving shaft 11 and may be of any of the well-known types. In this instance they comprise a pair of yokes 15 and 16 disposed in coplanar relationship. The yoke 15 comprises an internally splined sleeve 17 and yoke arms 18 and 19, the latter being pivotally connected to a spider 21 which is in turn pivotally connected to spaced ears 22 on a transmission ring 23. The transmission ring has spaced ears 25 for pivotal attachment to a spider 26 to which yoke arms 27 and 28 of the yoke 16 are pivotally attached. It will be seen that the yoke 15, the spider 21 and the spaced ears 22 form one universal joint, while the yoke 16, the spider 26 and the spaced ears 25 form the second universal joint, the two being connected by the ring 23 which forms a transmission member between the two joints. The internally splined sleeve 17 of the yoke 15 is mounted on the driving or power take-off shaft 11 of the tractor so that the interconnecting splines of the shaft 11 and sleeve 17 serve to transmit rotary motion from the shaft 11 to the joint 12 while simultaneously permitting relative longitudinal movement between the shaft 11 and the sleeve 17. It will be understood that while the connection between the sleeve 17 and the shaft 11 is described and herein shown as a conventional splined connection, this may be any connection which will transmit rotary motion from the shaft to the yoke and which will permit relatively longitudinal movement between these members, since many connections equivalent to the splined connection are well-known in the art.

The yoke 16 of the joint 13 is provided with a splined shaft 29 driven by the driving shaft 11 through the universal joint connection therebetween and adapted to interfit with a splined sleeve of the driven shaft (not shown) on the trailing auxiliary. It is contemplated that the shaft 29 shall be the shaft connecting the tractor with the trailed auxiliary and functions for the purpose of providing a power drive for the mechanism carried on the auxiliary. It is evident that many means may be employed for making this connection. For purposes of illustration, I have employed a connection using a splined shaft. It is readily apparent that any other suitable sliding connection could be utilized if desired.

The mechanism heretofore described acts to transmit the power from the drive shaft 11 to the forward end of the driven shaft and permits of relative angular movement between the drive shaft and the driven shaft. My invention is concerned with novel means providing one point support for the above mechanism that permits angular movement between the drive shaft 11 and the driven shaft about both a vertical and a horizontal axis so that under all angular conditons of the shafts within their range of operation, the power from the driving vehicle will be transmitted uniformly between the respective shafts. Thus, it contemplates a mechanism for supporting the universal joint assembly comprising a support 31 arranged to be attached to a part 30 fixedly secured to the tractor and overlying the drive shaft 11, a member 32 rotatable about a vertical axis located a predetermined distance from the driving vehicle and supported in a suspended manner from the support 31 and a bracket 33 pivotally mounted on the member 32 for supporting the yoke 13 whereby the latter is free to rotate while at the same time is movable about a horizontal axis.

While the part 30 can take any number of predetermined forms and shapes and any suitable means may be used to locate the vertical axis in a predetermined relation with the driving vehicle, I prefer to use a single member to effect the functions of these respective components. To this end I utilize a master power take-off shield 30 constructed in accordance with the standards of the American Society of Agricultural Engineers. As shown in the drawings the shield 30 comprises a top portion 34 overlying the drive shaft 11 with depending side portions 35 and 36 disposed on opposite sides thereof so as to in effect straddle the drive shaft 11. The top portion 34 (see Fig. 2) is shaped so that it flares outwardly from the end secured to the tractor. The side portions 35 and 36 are thus disposed at angles with respect to the longitudinal axis of the drive shaft 11. This construction permits angular movement of the power take-off assembly while at the same time forming a guard for the drive shaft 11.

In the present embodiment of the invention the support 31 is in the form of a plate shaped to be affixed to the master power take-off shield 30 as by bolts 37, so as to overlie the joints 12 and 13. The plate 31 is located in a predetermined position relative to the tractor. Herein the assembly of plate 31 on the shield is facilitated by a screw 38 threaded into the plate 31 and shaped to interfit with an elongated slot 39 (see Fig. 2) formed at the rearward edge 41 of the shield 30, these interfitting parts serving to initially locate plate 31 with respect to shield 30 upon assembly, bolts 37 being then inserted to form the permanent connection between plate 31 and shield 30. The shield 30 is secured to the tractor in such a manner that the slot 39 is positioned to overlie the longitudinal axis of the drive shaft 11 and is of such depth that preferably the screw 38, when disposed in the slot 39, is positioned so that the vertical axis about which the bracket 32 rotates is near alinement with the vertical pivotal axis of the hitching means (not shown). For reinforcement purposes a double layer of metal is provided at the portion of the shield 30 in which the slot 39 is formed. The forward end of the plate 31 is formed with a projection 42 which abuts against the underside of the shield 30 and which is of substantially the same thickness as the lower layer of metal at the slot end of the shield 30 so as to insure positive alinement of the plate 31 with the shield 30. An upturned lip 43 formed on the lower layer of metal forming the shield 30 and abutting against the rearward edge portion 41 of the upper layer of metal tends to minimize denting and the like of the rearward edge of the shield 30 during assembly of the respective component parts.

On its underside at one end, the plate 31 is formed with a circular recess 44, the bottom of which is machined to provide an annular bearing surface 45. The member 32 includes a trunnion 46 rigidly secured to a web 47. The trunnion 46 is provided with a disc shaped end 48 shaped to interfit in the recess 44. The end 48 is formed on opposite sides with bearing surfaces 49 and 51, the former of which is shaped to engage the bearing surface 45 and the latter of which engages a bearing surface 52 formed on a washer 53. The bearing surface 52 is in an opposed spaced relation with the bearing surface 45. The washer 53 is secured in a fixed position against an annular shoulder 50 at the mouth of the recess 44 by a snap ring 54. The washer 53 positions and supports the end 48 of the trunnion 46 in the recess 44. It is to be understood that the trunnion 46 is suspended from the plate 31 and is rotatable about the predetermined vertical axis.

As shown in Figure 1 the bracket 33 supporting the yoke 16 so that the latter is free to rotate includes an annular collar 55 retaining the ball bearing 56 encircling and supporting the shaft 29. On diametrically opposite sides of the collar 55, arms 57 project in the direction of the drive shaft 11 and are pivotally supported on posts 58 and 59 projecting outwardly from arms 61 and 62 depending from the web 47, on opposite sides of the yoke 16.

The instant construction provides for relative angular movement between the drive shaft 11 and the driven shaft about both a vertical and a horizontal axis. Thus, power can be transmitted uniformly from the driving shaft 11 to the driven shaft with the trailing implement at one side of the pulling vehicle as in making a turn, with the trailing vehicle slightly above or below the pulling vehicle such as occurs in passing over ridges or ditches in a field, or with any combination of the aforegoing relative positions of the pulling vehicle and the trailing implement.

Another phase of my invention is concerned with the provision of preventing accidental contact by an operator or of falling objects with the power take-off assembly. For this purpose the plate 31 is made of sufficient length and width such that it extends rearwardly of the vehicle beyond the power take-off shield 30 to which it is attached so as to overlie the yoke 15, the transmission ring 23 and the forward portion of the yoke 16. The web 47 of the bracket 32 is formed as a solid member and provides a continuation of the guard by overlying the intermediate portion of the yoke 16. The arms 61 and 62 on each side of the yoke 16 also prevent accidental contact with the yoke 16 from the side.

In the operation of the assembly the plate 31 is rigidly fastened to the shield 30 of the tractor so that in effect the shaft 29 forms a universal power take-off shaft for the tractor such that any driven shaft on a trailing vehicle may be connected to this shaft and proper drive conditions result. Where necessary suitable adapters may be utilized with the shaft 29 for effecting a connection between the shaft 29 and the auxiliary.

It will be seen that the support for the joint assembly and the shaft 29 is essentially through the collar 55, the arms 57, the arms 61 and 62, the web 47 and the trunnion 46 suspended from the plate 31 rigidly attached to the shield 30. Rotation of the drive shaft 11 causes rotary motion to be transmitted through the yoke 15, the spider 21, the transmission ring 23, the spider 26, and the yoke 16 to the driven shaft 29. When turning movement occurs as between the tractor and the trailing implement, angularity develops between the drive shaft 11 and the driven shaft, and the collar 55 moves with the shaft 29 through rotation of the member 32 about the vertical axis of the trunnion 46. The vertical axis normally intersects the centerline of the transmission ring 23 slightly forward of the center thereof. Thus, when in the position shown in Fig. 2 the angles formed by the yokes 15 and 16 with respect to the axis of rotation of the transmission ring 23 are substantially equal. As the shafts move out of alinement such as shown in Fig. 2 the yoke 15 moves or slides axially relative to the shaft 11 in a forward direction toward the tractor. As the shafts are again brought into alinement the yoke 15 moves axially rearwardly on the shaft 11 and assumes the position shown in Figure 1. The pivotal connection provided between the arms 61 and 62 and the arms 57 permit relative angular movement between the drive shaft 11 and the driven shaft in a vertical plane and are located slightly to the rear of the axis of the spider 26 to thereby provide a maximum degree of angular displacement between the shafts.

I claim:

1. In a power take-off assembly for driving an auxiliary having a driven shaft from a vehicle having a drive shaft, the combination of close coupled universal joints having a first yoke shaped to provide a driving connection with a driving shaft and a second yoke shaped to provide a driving connection with said driven shaft, at least one of said connections being a sliding connection, a member rigidly secured to said vehicle and overlying said driving shaft to form a guard therefor, a plate arranged to be attached to said member and having a recess formed at one end, means acting between said member and said plate for initially locating said plate and recess in a predetermined manner with respect to said member upon assembly of said plate onto said member, a trunnion shaped to fit in said recess and having a bearing surface, bearing means for engaging said bearing surface and supporting the trunnion whereby the latter is rotatable about a vertical axis, a supporting bracket in which one of the yokes is rotatably mounted and means rigid with said trunnion for providing a pivotal support for the supporting bracket whereby the last mentioned yoke is movable about a horizontal axis.

2. In a power take-off assembly for driving an auxiliary having a driven shaft from a vehicle having a drive shaft, the combination of close coupled universal joints having a first yoke shaped to provide a driving connection with a driving shaft and a second yoke shaped to provide a driving connection with said driven shaft, at least one of said connections being a sliding connection, a member rigidly secured to said vehicle comprising a top portion overlying said driving shaft and depending side portions straddling said driving shaft to form a guard, a plate arranged to be attached to said guard in a predetermined manner and having a recess formed at one end, said plate being of such width and length that it extends outwardly from said guard to substantially overlie said joints and form an extension of said guard, a trunnion shaped to fit in said recess and having a bearing surface, bearing means engaging said surface for supporting said trunnion in the recess so that the latter is rotatable about a vertical axis at a predetermined distance from the vehicle, a supporting bracket in which one of the yokes is rotatably mounted, and means rigid with said trunnion providing a pivotal support for the supporting bracket whereby the last-mentioned yoke is movable about a horizontal axis.

3. In a power take-off assembly for driving an auxiliary having a driven shaft from a vehicle having a drive shaft, the combination of close coupled universal joints having a first yoke shaped to provide a driving connection with the driving shaft and a second yoke shaped to provide a driving connection with said driven shaft, a plate arranged to be attached in a predetermined position to a stationary part of the vehicle and having a circular recess formed on its underside, said recess having a bearing surface formed on its interior, a trunnion having an enlarged disc shaped end shaped to rotatably fit in said recess having a top surface arranged to abut said bearing surface and a bottom surface, an annular ring shaped to abut said bottom surface and provide a support for said end, means for retaining said ring in a fixed position in said recess so that said trunnion is rotatable about a first axis at a predetermined distance from the vehicle, a supporting bracket in which one of the yokes is rotatably mounted, and means rigid with said trunnion providing a pivotal support for the supporting bracket whereby the last-mentioned yoke is movable about an axis substantially perpendicular to the first axis.

4. In a power take-off assembly for driving an auxiliary having a driven shaft from a vehicle having a drive shaft, the combination of close coupled universal joints having a first yoke shaped to provide a driving connection with the driving shaft and a second yoke shaped to provide a driving connection with said driven shaft, at least one of said connections being a sliding connection, a member extending outwardly from the tractor having a slot formed therein, a plate shaped to be attached to said member having a screw thereon shaped to interfit in said slot to initially locate the plate relative to the member upon assembly of the plate onto the member, said plate having a first and second bearing surface in opposed spaced relation, first means having a third and fourth bearing surface engageable with the first and second bearing surfaces respectively to support said first means so that said first means is free to rotate about a vertical axis, a supporting bracket in which one of the yokes is rotatably mounted, and means rigid with said first means for providing a pivotal support for the supporting bracket whereby said last-mentioned yoke is movable about a horizontal axis.

5. In a power take-off assembly for driving an auxiliary having a driven shaft from a vehicle having a drive shaft, the combination of close coupled universal joints having a first yoke shaped to provide a driving connection with the driving shaft and a second yoke shaped to provide a driving connection with said driven shaft, at least one of said connections being a sliding connection, a plate arranged to be attached to a stationary part of the vehicle in a predetermined position and having a recess formed at one end, a trunnion disposed in said recess and having a bearing surface, bearing means engaging said surface to support said trunnion so that the trunnion is rotatable about a vertical axis located at predetermined distance from the vehicle, a supporting bracket in which one of the yokes is rotatably mounted, and means rigid with said trunnion for providing a pivotal support for the supporting bracket whereby the last-mentioned yoke is movable about a horizontal axis.

6. The combination with a vehicle, of a power take-off assembly for driving a trailing machine, comprising a driving shaft on said vehicle, a driven shaft adapted to be connected to said trailing machine, close coupled universal joints having a first yoke disposed in driving relation with said driving shaft and a second yoke in driving relation with said driven shaft, a shield attached to a stationary part of said vehicle above said driving shaft and shaped to extend rearwardly to a point above said joints, a plate secured to said shield disposed over said joints to prevent accidental contact therewith from the top, a bearing member rotatably supported solely on said plate with its axis of rotation disposed at a predetermined position from the tractor and substantially vertically above the centerline of said driving shaft, said bearing member having a web portion disposed in approximately parallel relation with said plate and depending arms, and a bearing bracket for supporting one of said yokes, said bearing bracket being pivotally supported on said depending arms for rotation about a horizontal axis.

CARL E. SWENSON.

REFERENCES CITED

The following references are of record in the file of this patent:

UNITED STATES PATENTS

| Number | Name | Date |
| --- | --- | --- |
| 2,282,267 | Swenson et al. | May 5, 1942 |
| 2,303,180 | Swenson | Nov. 24, 1942 |
| 2,410,503 | Johnson | Nov. 5, 1946 |
| 2,443,035 | Hardy | June 8, 1948 |